United States Patent Office 3,795,687
Patented Mar. 5, 1974

---

3,795,687
PROCESS FOR THE PRODUCTION OF 6-FLUORO-5-BROMO-13-ETHYL STEROIDS
Ulrich Kerb, Berlin, Germany, assignor to Schering Aktiengesellschaft, Berlin and Bergkamen, Germany
No Drawing. Filed Dec. 29, 1971, Ser. No. 213,734
Claims priority, application Germany, Dec. 30, 1970,
P 20 64 860.6
Int. Cl. C07c 167/00
U.S. Cl. 260—397.4               6 Claims

ABSTRACT OF THE DISCLOSURE

6β-fluoro-5α-bromo-13-ethyl steroids, especially those of the formula

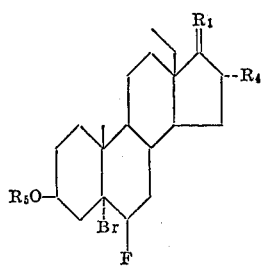

wherein $R_1$ is

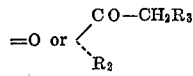

in which $R_2$ and $R_3$ are hydrogen, hydroxy or acyloxy; $R_4$ is hydrogen or methyl; and $R_5$ is hydrogen or acyl, are prepared by simultaneously reacting the corresponding 13-ethyl-Δ⁵-steroids with a fluorination reagent and a bromination reagent.

BACKGROUND OF THE INVENTION

This invention relates to novel 6β-fluoro-5α-bromo-13-ethyl steroids and to a process for the production thereof.

The bromine-fluorine addition to the Δ⁵-double bond of 13-methyl steroids is known (U.S. Pat. 3,173,914, German published applications OS 1,593,499 and OS 1,916,823). According to these known reactions, hydrogen fluoride is first allowed to react with the double bond in the 5(6)-position and the brominating reagent, e.g., N-bromo-succinimide or N-bromo-acetamide, is then added to the thus-obtained reaction mixture in order to continue the reaction. The thus-obtained reaction products are 5α-bromo-6β-fluoro-13-methyl steroids.

These conventional processes, however, cannot be employed analogously for the production of 6β-fluoro-5α-bromo-13-ethyl steroids. Instead of the desired compounds, only 5α-fluoro-6β-bromo-13-ethyl steroids and other by-products are obtained.

It has now been found, surprisingly, that 13-ethyl-Δ⁵-steroids can be converted into the desired 6β-fluoro-5α-bromo-13-ethyl steroids if reaction with the fluorination reagent and the bromination reagent is effected simultaneously.

SUMMARY OF THE INVENTION

Of the products of the bromo-fluorination process of this invention, preferred are those of the General Formula I

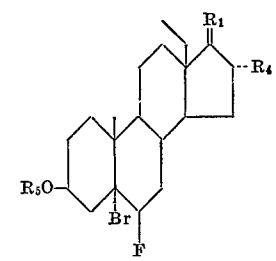

wherein $R_1$ is

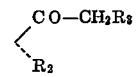

in which $R_2$ and $R_3$ are hydrogen, hydroxy or acyloxy; $R_4$ is hydrogen or methyl; and $R_5$ is hydrogen or acyl.

In its process aspect, this invention relates to a process for the production of 6β-fluoro-5α-bromo-13-ethyl steroids in which a mixture of hydrogen fluoride and an N-bromoacyl-amide or -imide is reacted simultaneously with the corresponding Δ⁵-steroid.

DETAILED DISCUSSION

Acyl as used herein is the acyl radical of an acid customarily employed in the steroid chemistry for esterifications. Preferred acids are organic carboxylic acids up to 15 carbon atoms.

It will be apparent to those skilled in the art that the exact nature of the acyl group of $R_2$, $R_3$ and $R_5$ is not critical to the utility of the compounds of Formula I. Although the acyl group of alkanoic, especially lower-alkanoic, acids are perferred, a wide variety of acyl groups can be present in the starting materials and products of this invention. Thus, equivalents of the compounds of this invention containing one or more acyl groups of an alkanoic acid are those wherein the acyl radical is that of another organic acid, e.g., a carboxylic acid containing up to 15 carbon atoms, especially lower (1–6) carbon atoms and intermediate (7–12) aliphatic carboxylic, preferably an alkanoic acid, which can be saturated or unsaturated, straight or branched. Examples of preferred alkanoic acids are formic, acetic, propionic, butyric, isobutyric, trimethylacetic, α-ethylbutyric, valeric, isovaleric, α-ethylvaleric, 2-methylbutyric, 3-ethylbutyric, hexanoic, diethylacetic, triethylacetic, caproic, enanthic, octanoic, undecylic, oleic and palmitic acid. Examples of equivalents of such acids are cyclic acids, preferably a cycloaliphatic acid, containing, e.g., 5–18 carbon atoms, e.g., cyclopropylideneacetic, cyclobutylcarboxylic, cyclopentylcarboxylic, cyclopentylacetic, cyclopentylpropionic, cyclohexyl, cyclohexylacetic and β-cyclohexylpropionic acid; a carbocyclic aryl or alkaryl acid, e.g., containing 6–18 carbon atoms, and 1 to 5, preferably 1 or 2 rings, e.g., benzoic, 2-, 3-, or 4-methyl-benzoic, 2,3-, 2,4-, 2,5-, 2,6-, 3,4-, and 3,5-dimethylbenzoic, ethylbenzoic, 2,3,6-trimethylbenzoic, and 3-methyl-α-naphthoic acid; an aralkyl acid, e.g., containing 7 to 18 carbon atoms, e.g., phenylacetic, β-phenylpropionic, a polybasic acid, e.g., containing 2–18 carbon atoms and 0 to 5 hydroxy groups e.g., glycolic, lactic, succinic, adipic, citric, tartaric, d-maleic, d-glyceric, and salicylic acid; the corresponding acids containing one, two or more of substituents, e.g., halo, oxo, amino, alkoxy, acyloxy, etc., in the molecule, e.g., mono-, di- and trichloroacetic, fluoroacetic, trichloroacetic, trifluoroacetic, 2,3,4-trimethoxybenzoic, phenoxyacetic, α-naphthoxyacetic acid, nicotinic acid, aminoacetic, lower-alkylamino and di-lower-alkylaminoacetic acids, e.g., ethylaminoacetic and diethylaminoacetic, O-, N- or S-heterocyclic substituted-alkanoic acids, e.g., piperidinoacetic and morpholinoacetic acid.

Examples of specific compounds of this invention are 6β-fluoro-5α-bromo-3β-hydroxy - 18 - methyl-5α-androstan - 17 - one and 3-acyloxy esters thereof, preferably lower-alkanoyloxy, e.g., acetoxy; 6β-fluoro-5α-bromo-3β-hydroxy-16α,18-dimethyl-5α-androstan-17-one and 3-acyloxy esters thereof, preferably lower-alkanoyloxy, e.g., acetoxy; 6β-fluoro-5α-bromo - 18 - methyl-5α-androstan-3β,17β-diol and 3-mono, 17-mono and 3,17-diacyloxy esters thereof, preferably lower-alkonyloxy, e.g., acetoxy; 6β-fluoro-5α-bromo-16α,18-dimethyl, 5α-androstan-3β,17β-diol and 3-mono, 17-mono and 3,17-diacyloxy esters thereof, preferably lower-alkonyloxy, e.g., acetoxy; 6β-fluoro-5α-bromo-3β,21 - dihydroxy - 18 - methyl-5α-pregnan-20-one and 3-mono,21-mono- and 3,21-diacyloxy esters thereof, preferably lower-alkanoyloxy, e.g., acetoxy; 6β-fluoro-5α-bromo - 3β,21 - dihydroxy-16α,18-dimethyl - 5α - pregnan - 20 - one and 3-mono,21-mono- and 3,21-diacyloxy esters thereof, preferably lower-alkanoyloxy, e.g., acetoxy; 6β-fluoro-5α-bromo-3β,17α,21-trihydroxy-18-methyl-5α-pregnan-20-one and 3-mono,21-mono,3,21-di and 3,17-21-triacyloxy esters thereof, preferably lower-alkanoyloxy, e.g., acetoxy; 6β - fluoro - 5α-bromo-3β,17α,21 - trihyrdoxy - 16α,18 - dimethyl-5α-pregnan-20-one and 3-mono,21-mono,3,21-di and 3,17,21-triacyloxy esters thereof, preferably lower-alkanoyloxy, e.g., acetoxy.

The products of the process of this invention are useful as intermediates for the preparation of valuable effective agents for drugs. Thus, for example, in accordance with conventional modes of operation, 6β - fluoro - 5α-bromo - 3β - hydroxy - 21 - acetoxy - 16α,18-dimethyl-5α - pregnan-20-one can be converted by the steps of oxidation of the 3-hydroxy group with simultaneous dehydrobromination to form a 3-keto-Δ⁴-group, microbiological 11α-hydroxylation, microbiological or chemical-introduction of a Δ¹-double bond, followed by conversion of the 9α - H - 11α - OH group into the 9α-halo-11β-OH group, e.g., the 9α - chloro - 11β-hydroxy group, the antiphlogistically active 6α-fluoro - 9α - chloro-11β,21-dihydroxy - 16α,18 - dimethyl - pregna - 1,4-diene-3,20-dione which, if desired, can be reacylated at the 21-position.

Preferred starting steroids for the process of this invention are 13-ethyl steroids of the General Formula II

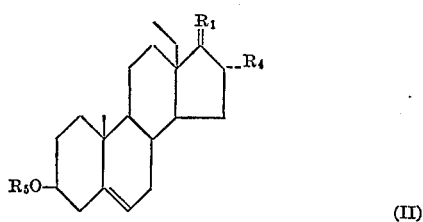

(II)

wherein $R_1$, $R_4$ and $R_5$ have the values given in Formula I.

The desired bromine-fluorine addition occurs at low temperatures rapidly and with good yields. The process of the present invention is therefore suitably conducted at about room temperature or below, preferably —70 to 0° C. Reaction times from a few seconds to several minutes or hours can be employed.

In carrying on the process of this invention, a solution of hydrogen fluoride and the selected N-bromoacyl-amide or -imide is employed in an inert solvent. Aprotic solvents, such as, for example, dimethylformamide, tetrahydrofuran, dimethylacetamide, hexamethylphosphoric triamide, N-methylpyrrolidone, dioxane, etc., are usually employed. The reaction is conducted preferably under anhydrous conditions.

The solvent mixture of hydrogen fluoride and the bromination reagent can be added to a solution of the 13-ethyl-Δ⁵-steroid or vice versa. The molar ratio of hydrogen fluoride is 1 to 100 mols, preferably 10 to 50 mols, and that of the brominating reagent is 1–2 mols, preferably 1.1–1.5 mols, calculated on the steroid.

For the preparation of the steroid solution, any inert solvent can be used, e.g., aliphatic, alicyclic, and aromatic hydrocarbons, which can also be halogenated, e.g., methylene chloride, chloroform, hexane, benzene, etc.

Specific examples of the N-bromoacylamides and -imides which can be employed are N-bromoacetamide and N-bromosuccinimide, which are especially suitable. Any other source of positive bromine can also be employed.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

PREPARATION

17β-hydroxy-18-methyl-5(10)-estren-3-one is reduced in tetrahydrofuran at room temperature and under a pressure of 200 atmospheres with hydrogen and freshly prepared Raney nickel, thus producing 18-methyl-5(10)-estrene-3β,17β-diol, M.P. 165–166° C.

The latter compound is treated, in dimethoxyethane-diethyl ether at 50° C., with methyl iodide in the presence of zinc-copper, thus producing 18-methyl-5,10β-methylene-estrane-3β,17β-diol, M.P. 116–117.5° C., which latter is oxidized, in acetone with aqueous chromic anhydride/sulfuric acid, to 18-methyl-5,10β-methylene-estrane-3,17-dione, M.P. 142–143.5° C.

The thus-produced dione is heated in glacial acetic acid with concentrated hydrochloric acid to 80° C., thus producing 18-methyl-4-androstene-3,17-dione, M.P. 141–142° C., which latter compound is isomerized by treatment with potassium tert.-butylate in tetrahydrofuran at 0° C. to 18-methyl-5-androstene-3,17-dione.

The last-mentioned compound is reduced with lithium tri-tert.-butoxyhydride, at room temperature, in tetrahydrofuran, to 3β-hydroxy-18-methyl-5-androsten-17-one, M.P. 166–168° C.

The thus-obtained-3β-hydroxy steroid is ethynylated with lithium acetylide in ethylenediamine and then acetylated with acetic anhydride-pyridine, thus producing 3β-acetoxy-18-methyl-17α-ethinyl-5 - androsten - 17β - ol. M.P. 60–62° C., which is converted by heating with phosphorus oxychloride in lutidine to 100° C. to 3β-acetoxy-18-methyl-5,16-pregnadien-20-yne, M.P. 86.5–87.5° C.

The thus-produced pregnadiene is reacted in methanol at 0° C. with mercury(II) acetate and boron trifluoride etherate, to produce 3β-acetoxy-18-methyl-5,16-pregnadien-20-one, M.P. 129.5–130.5° C.

The latter compound is methylated in tetrahydrofuran-ether at 0° C. with methylmagnesium iodide in the presence of copper(I) chloride thus producing 3β-hydroxy-16α,18-dimethyl-5-pregnen-20-one, M.P. 167–170° C.

The 16α-methyl compound is reacted in methylene chloride with the diethyl ester of oxalic acid and sodium methylate at 60° C. The product of this reaction is isolated as the crude compound and reacted at −20° C. with a methanolic iodine solution, and then treated with sodium methylate, thus obtained 21-iodo-3β-hydroxy-16α,18-dimethyl-5-pregnen-20-one which is converted by heating with potassium acetate in acetone under reflux, to 3β-hydroxy-21-acetoxy-16α,18-dimethyl-5-pregnen-20-one, M.P. 137.5–138.5° C.

EXAMPLE 1

At 40° C., 7.75 g. (0.044 mol) of N-bromsuccinimide is introduced into a solution of 80 ml. of dimethylformamide and 75 ml. of hydrogen fluoride. Thereafter, a solution of 15.5 g. (0.036 mol) of 3β-hydroxy-21-acetoxy-16α,18-dimethyl-5-pregnen-20-one in 80 ml. of methylene chloride is added to the reaction mixture and the latter agitated for 5 minutes at −12° C. The reaction mixture is then stirred into ice water containing potassium bicarbonate to neutralize the reaction mixture, extracted with methylene chloride, and the separated organic phase is washed neutral with water. After evaporating the solvent under vacuum, the residue is recrystallized from ether. The thus-obtained 6β-fluoro-5α-bromo-3β-hydroxy-21-acetoxy-16α,18-dimethyl-5α-pregnan-20-one melts at 139–140° C. with decomposition. Yield: 70% of theory.

EXAMPLE 2

At −20° C., 0.5 g. of N-bromosuccinimide is introduced into a solution of 5 ml. of dimethylformamide and 4 ml. of hydrogen fluoride. A solution of 1 g. of 3β-hydroxy-18-methyl-5-androsten-17-one in 4 ml. of methylene chloride is then added thereto. The mixture is stirred for 5 minutes at −8 to −10° C. and worked up analogously to Example 1. The thus-produced 6β-fluoro-5α-bromo-3β-hydroxy-18-methyl-5α-androstan-17-one, after recrystallization from isopropyl ether-ethyl chloride, melts at 189–190° C. with decomposition. Yield: 75% of theory.

EXAMPLE 3

At −60° C., 0.25 g. of N-bromosuccinimide is added to a solution of 1.3 ml. of hydrogen fluoride in 1.9 ml. of tetrahydrofuran followed by a solution of 0.55 g. of 3β-hydroxy - 21 - acetoxy-16α,18-methyl-dimethyl-5-pregnen-20-one in 4 ml. of methylene chloride. The mixture is agitated for 10 minutes at −50° C. and worked up analogously to Example 1. The thus-obtained 6β-fluoro-5α-bromo-3β-hydroxy-21-acetoxy - 16α,18 - dimethyl-5α-pregnan-20-one is identical to the product of Example 1.

EXAMPLE 4

11.9 g. of 6β-fluoro-5α-bromo-3β-hydroxy-21-acetoxy-16α,18-dimethyl-5α-pregnan-20-one are dissolved in 200 ml. of acetone, 6 ml. of Jones' reagent (267 g. of chromic acid in 230 ml. of concentrated sulfuric acid completed to 1000 ml.) are added dropwise and the reaction mixture is stirred for 10 minutes at room temperature. The mixture is then poured into ice water, the precipitate is filtered off, dissolved in methylene chloride, washed neutral with water and concentrated under vacuum at 30° C.

The residue (11 g.) is dissolved in 110 ml. of acetic acid and stirred for 3 hours at 30° C. 3.3 g. of sodium acetate are added, stirred for 10 minutes at room temperature and poured into ice water.

The thus-obtained 6α-fluoro - 21 - acetoxy-16α,18-dimethyl-4-pregnen-3,20-dione is filtered off, washed neutral and crystallized from acetone-hexane.

Melting point: 138.5–140° C.

EXAMPLE 5

A 15 liter glass fermenter charged with 8 liters of a sterilized nutrient medium containing 1% corn steep liquor, 1% soja-bean-powder and 0.005% soja-bean oil is inoculated with a culture of *Aspergillus ochraceus* (ATTC 1008) and subjected to shaking while aerating at 29° C. After 7 hours, 4 g. of 6α-fluoro-21-acetoxy-16α,18-dimethyl-4-pregnen-3,20-dione in 80 ml. of dimethyl sulfoxide are added.

The reaction mixture is extracted with methylisobutylketone after a contact time of 40 hours. The extract is concentrated under vacuum until dryness. The residue is purified by column chromatography on silica gel. The thus-obtained 6α-fluoro-11α,21-dihydroxy-16α,18-dimethyl-4-pregnen-3,20-dione melts at 232–235° C.

EXAMPLE 6

1.4 g. of 6α-fluoro-11α,21-dihydroxy-16α,18-dimethyl-4-pregnen-3,20-dione are dissolved in 150 ml. dimethyl formamide and the solution is divided into ten parts and added to 2 liter conical flasks containing each 600 ml. of a 0.05 molar solution of 2-amino-2-hydroxymethyl-1,3-propan-diol in water as buffer. 5 g. of a lyophilized culture of *Bacillus lentus* (ATTC 13805) are then added to each flask and shaken for 50 hours at 30° C. Thereafter, the contents of the flasks are collected and extracted with methylisobutylketone. The extract is concentrated under vacuum until dryness. The residue is purified by column chromatography on silica gel. The thus-obtained 6α-fluoro-11α,21-dihydroxy-16α,18-dimethyl - 1,4 - pregnadien-3,20-dione melts at 228–230° C.

EXAMPLE 7

320 mg. of 6α-fluoro-11α,21-dihydroxy-16α,18-dimethyl-1,4-pregnadien-3,20-dione in 3 ml. of dimethyl formamide are reacted with 0.6 ml. of acetic anhydride and 35 mg. of lead(II) acetate. The reaction mixture is stirred for 2 hours at room temperature, poured into ice water, extracted with methylene chloride, washed neutral with water and concentrated under vacuum.

The thus-obtained 6α - fluoro-11α-hydroxy-21-acetoxy-16α,18-dimethyl-1,4-pregnadien-3,20-dione (300 mg.) is purified by thin layer chromatography (chloroform/methanol 95/5), dissolved in 1.5 ml. of pyridine and reacted with methane sulfonic acid while cooling with ice. The reaction mixture is stirred for 1.5 hours at room temperature, diluted with ice water and extracted with methylene chloride. The extract is washed until neutral with water and concentrated.

The thus-obtained 6α-fluoro-11α-mesyloxy-21-acetoxy-16α,18-dimethyl-1,4-pregnadien-3,20-dione (300 mg.) is purified by thin layer chromatography (chloroform/methanol 95/5) dissolved in 9 ml. of acetic acid and heated under reflux with 600 mg. of anhydrous sodium acetate for 3.5 hours. The reaction mixture is poured into ice water and the precipitate is filtered off, washed neutral and dried.

187 mg. of 6α-fluoro-21-acetoxy-16α,18-dimethyl-1,4,9 (11)-pregnatrien-3,20-dione thus-obtained are dissolved in 7 ml. of tetrahydrofuran and 600 mg. of N-chlorosuccinimide and 5.3 ml. of 1 N perchloric acid are added. The reaction mixture is stirred for 2.5 hours at 35° C., concentrated under vacuum at 30° C. and the residue dissolved in methylene chloride. The solution is washed neutral with water, dried and concentrated under vacuum. The residue is purified by layer chromatography (acetone/methanol 95/5) and recrystallized from acetone/isopropyl ether. The 6α-fluoro-9α-chloro-11β-hydroxy-21-acetoxy-16α,18-dimethyl-1,4-pregnadien-3,20-dione melts at 203.5–204.5° C. under decomposition.

EXAMPLE 8

110 mg. of 6α-fluoro-21-acetoxy-16α,18-dimethyl-1,4,9 (11)-pregnatrien-3,20-dione dissolved in 2 ml. of tetrahydrofuran are reacted with 0.9 ml. of 1 N perchloric acid and 143 mg. of N-bromsuccinimide. The reaction mixture is stirred for 30 minutes at 30° C. and poured into ice water. The precipitate is filtered off, washed neutral with water, dissolved in methylene chloride and the solution is concentrated under vacuum. The thus-obtained bromohydrin is heated under reflux with 220 mg. of potassium acetate in 5 ml. of ethanol for one hour. The reaction mixture is diluted with methylene chloride, washed with water and concentrated under vacuum. 80 mg. of 6α-fluoro - 21 - acetoxy - 9,11β - epoxy - 16α,18-dimethyl-1,4-pregnadien-3,20-dione thus-obtained are dissolved in 1 ml. of dimethylformamide and added dropwise to a solution of 2 ml. hydrofluoric acid and 2 ml. dimethylformamide at —10° C. The reaction mixture is maintained at +5° C. for 24 hours and then poured into a dilute aqueous ammonia at 0° C. The precipitate is filtered off, washed neutral and dried. The 6α,9α-difluoro-11β-hydroxy-21-acetoxy - 16α,18 - dimethyl - 1,4 - pregnadien-3,20-dione thus-obtained is recrystallized from acetone/hexane and melts at 142–144° C.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the produces of 6β-fluoro-5α-bromo-13-ethyl steroids which comprises simultaneously reacting a 13-ethyl-Δ⁵ steroid with a preformed mixture of hydrogen fluoride and an N-bromoacylamide or -imide.

2. A process according to claim 1 wherein the N-bromoacylamide or -imide is N-bromoacetamide or N-bromosuccinimide.

3. A process according to claim 1 wherein the reaction is conducted at —70 to 0° C. in an aprotic solvent.

4. A process according to claim 1 wherein the starting steroid is a compound of the formula

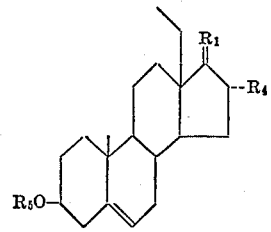

wherein $R_1$ is

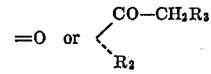

in which $R_2$ and $R_3$ are hydrogen, hydroxy or acyloxy; $R_4$ is hydrogen or methyl; and $R_5$ is hydrogen or acyl.

5. A process according to claim 3 wherein the solvent is dimethylformamide.

6. A process according to claim 3 wherein the reaction is conducted under anhydrous conditions and the N-bromoacylamide or -imide is N-bromoacetamide or N-bromosuccinimide.

References Cited
UNITED STATES PATENTS

| | | | |
|---|---|---|---|
| 3,155,695 | 11/1964 | Bowers et al. | 260—397.45 |
| 3,173,914 | 3/1965 | Bowers | 260—239.55 |
| 3,364,204 | 1/1968 | Diassi et al. | 260—239.55 |
| 3,641,013 | 2/1972 | Engelfried et al. | 424—243 |
| 3,644,440 | 2/1972 | Douglas et al. | 260—397.4 |
| 3,646,075 | 2/1972 | Berndt et al. | 260—397.4 |
| 3,681,404 | 8/1972 | Wieske | 260—397.4 |

HENRY A. FRENCH, Primary Examiner

260—397.45, 397.47, 397.5

UNITED STATES PATENT OFFICE
CERTIFICATE OF CORRECTION

Patent No. 3,795,687　　　　　　　　　　Dated March 5, 1974

Inventor(s) Ulrich Kerb

It is certified that error appears in the above-identified patent and that said Letters Patent are hereby corrected as shown below:

IN THE CLAIMS:

Claim 1, Column 7, Line 1 of the claim: "produces" should read -- production --.

Signed and sealed this 2nd day of July 1974.

(SEAL)
Attest:

EDWARD M. FLETCHER,JR.　　　　　C.MARSHALL DANN
Attesting Officer　　　　　　　　Commissioner of Patents